United States Patent
Iizawa

(10) Patent No.: US 11,467,748 B2
(45) Date of Patent: Oct. 11, 2022

(54) CONTROL APPARATUS AND COMPUTER-READABLE RECORDING MEDIUM HAVING STORED THEREIN CONTROL PROGRAM

(71) Applicant: Fujitsu Limited, Kawasaki (JP)

(72) Inventor: Ken Iizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 16/745,406

(22) Filed: Jan. 17, 2020

(65) Prior Publication Data

US 2020/0272351 A1 Aug. 27, 2020

(30) Foreign Application Priority Data

Feb. 25, 2019 (JP) .............................. JP2019-031240

(51) Int. Cl.
*G06F 3/06* (2006.01)
*G06N 7/00* (2006.01)

(52) U.S. Cl.
CPC ............ *G06F 3/0647* (2013.01); *G06F 3/061* (2013.01); *G06F 3/068* (2013.01); *G06N 7/005* (2013.01)

(58) Field of Classification Search
USPC ........................................................ 711/117
See application file for complete search history.

(56) References Cited

U.S. PATENT DOCUMENTS

| | | | |
|---|---|---|---|
| 9,026,765 B1 * | 5/2015 | Marshak | G06F 12/0866 711/170 |
| 2003/0079084 A1 | 4/2003 | Gotoh et al. | |
| 2006/0059301 A1 | 3/2006 | Sugino et al. | |
| 2013/0254483 A1 * | 9/2013 | Iida | G06F 3/061 711/117 |
| 2018/0329756 A1 * | 11/2018 | Kan | G06F 9/50 |
| 2020/0117400 A1 * | 4/2020 | Golov | G06F 3/068 |
| 2021/0064337 A1 * | 3/2021 | Imazu | G06F 13/00 |

FOREIGN PATENT DOCUMENTS

| | | |
|---|---|---|
| JP | 2003-131908 | 5/2003 |
| JP | 2006-079432 | 3/2006 |
| JP | 2015-501958 | 1/2015 |

* cited by examiner

*Primary Examiner* — Charles Rones
*Assistant Examiner* — Jonah C Krieger
(74) *Attorney, Agent, or Firm* — Fujitsu Patent Center

(57) ABSTRACT

A control apparatus includes a processor configured to execute a procedure including: receiving, from a processing device, a reading request to read a first data piece among a plurality of data pieces included in a data set, the processing device executing a given process on each of the data pieces; reading the first data piece from a first storage tier among a plurality of hierarchical storage tiers having respective different reading capabilities; transmitting the read first data piece to the processing device in response to the reading request; measuring a processing time that the processing device takes to execute the given process; determine a storage tier that is to store the first data piece among the hierarchical storage tiers based on the reading capabilities and the measured processing time; and migrating the first data piece from the first storage tier to the determined storage tier.

12 Claims, 15 Drawing Sheets

FIG.7

EXAMPLE OF HIERARCHY TABLE      21d

| DATA ID | STORING DESTINATION | STORING POSITION |
|---|---|---|
| ds1_data00001 | SSD#2 | xxxxxxx |
| ds1_data00002 | SSD#2 | yyyyyyy |
| ⋮ | ⋮ | ⋮ |
| ds2_data01234 | HDD#1 | zzzzzzz |
| ⋮ | ⋮ | ⋮ |
| ds3_data11111 | TD | Volume1 |
| ⋮ | ⋮ | ⋮ |

FIG.8

EXAMPLE OF MEASURED VALUE   21b

| WF#0 |
|---|
| $T_P(1), ..., T_P(i-1), T_P(i), T_P(i+1), ..., T_P(N)$ |

21b

| WF#1 |
|---|
| $T_P(1), ..., T_P(i-1), T_P(i), T_P(i+1), ..., T_P(N)$ |

EXAMPLE OF PARAMETER  21c

| WF#0 |
|---|
| N |
| $d_1, ..., d_{i-1}, d_i, d_{i+1}, ..., d_N$ |
| $S_1, ..., S_{i-1}, S_i, S_{i+1}, ..., S_N$ |
| $B_D \{B_{SSD}, B_{HDD}, B_{TD}\}$ |
| $T_{I/O}(1), ..., T_{I/O}(i-1), T_{I/O}(i), T_{I/O}(i+1), ..., T_{I/O}(N)$ |
| $t_S(1), ..., t_S(i-1), t_S(i), t_S(i+1), ..., t_S(N)$ |
| $t_F(1), ..., t_F(i-1), t_F(i), t_F(i+1), ..., t_F(N)$ |
| $t_D(1), ..., t_D(i-1), t_D(i), t_D(i+1), ..., t_D(N)$ |

21c

| WF#1 |
|---|
| N |
| $d_1, ..., d_{i-1}, d_i, d_{i+1}, ..., d_N$ |
| $S_1, ..., S_{i-1}, S_i, S_{i+1}, ..., S_N$ |
| $B_D \{B_{SSD}, B_{HDD}, B_{TD}\}$ |
| $T_{I/O}(1), ..., T_{I/O}(i-1), T_{I/O}(i), T_{I/O}(i+1), ..., T_{I/O}(N)$ |
| $t_S(1), ..., t_S(i-1), t_S(i), t_S(i+1), ..., t_S(N)$ |
| $t_F(1), ..., t_F(i-1), t_F(i), t_F(i+1), ..., t_F(N)$ |
| $t_D(1), ..., t_D(i-1), t_D(i), t_D(i+1), ..., t_D(N)$ |

⋮

CONTROL APPARATUS AND COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent application No. 2019-031240, filed on Feb. 25, 2019, the entire contents of which are incorporated herein by reference.

FIELD

The present disclosure relates to a control apparatus and a computer-readable recording medium having stored therein a control program.

BACKGROUND

A hierarchical storage system has been known in which multiple storing devices (storing media) are combined for an information processing system that stores data. Examples of the kind (type) of such a storing device include a Solid State Drive (SSD), a Hard Disk Drive (HDD), a Tape Drive (TD) in the order of higher performance (faster access speed).

In a hierarchical storage system, a control device (hereinafter, sometimes referred to as a "server") such as a storage controller may perform hierarchical control that changes a tier (storing tier) of a storing device in which data is arranged (stored) in accordance with a frequency of accessing the data.

In the hierarchical control, the server arranges data with a low access frequency in a storing device with a low performance, while arranging data with high access frequency or data related to the data in a storing device with a high performance. This enables the hierarchical storage system to enhance the efficiency of use of the high-performance storing device, and enhance the response performance to the information processing apparatus (hereinafter sometimes referred to as a "client") that is the access source.

[Patent Document 1] Japanese Laid-open Patent Publication No. 2006-79432

[Patent Document 2] Japanese National Publication of International Patent Application No. 2015-501958

[Patent Document 3] Japanese Laid-open Patent Publication No. 2003-131908

In a hierarchical storage system, data used in a series of processes, such as machine learning or data mining that uses Artificial Intelligence (AI) may be stored. Here, "a series of processes" means a group of processes that can be systematized and repeatedly performed, and may foe referred to as a "workflow" or "WF".

In a WF such as machine learning or data mining, a client accesses (e.g., reads data) the hierarchical storage system by an application for executing the WF instead of a conventional manual access made by man.

Access from the application to the hierarchical storage system may have an access tendency (trend) different from that of a conventional manual access in terms of, for example, a data range to be accessed, transition of the data range, a frequency, and the number of accesses.

Therefore, in the hierarchical storage system, the server does not perform appropriate hierarchical control for access from a client executing the application, and the response performance to the client may be degraded.

SUMMARY

According to an aspect of the embodiment, a control apparatus includes: a memory; and a processor coupled to the memory, the processor being configured to execute a procedure, the procedure including: receiving, from a processing device, a reading request to read a first data piece among a plurality of data pieces included in a data set, the processing device executing a given process on each of the plurality of data pieces; reading the first data piece from a first storage tier that stores the first data piece among a plurality of hierarchical storage tiers having respective different reading capabilities; transmitting the first data piece read from the first storage tier to the processing device in response to the reading request; measuring a processing time that the processing device takes to execute the given process; determining a storage tier that is to store the first data piece among the plurality of hierarchical storage tiers based on the reading capabilities of the plurality of the storage tiers and the measured processing time; and migrating the first data piece from the first storage tier to the determined storage tier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7 is a diagram illustrating an example of a hierarchical table;

FIG. 8 is a diagram illustrating an example of a measured value;

FIG. 9 is a diagram illustrating an example of a parameter;

DESCRIPTION OF EMBODIMENTS

Figure 1:
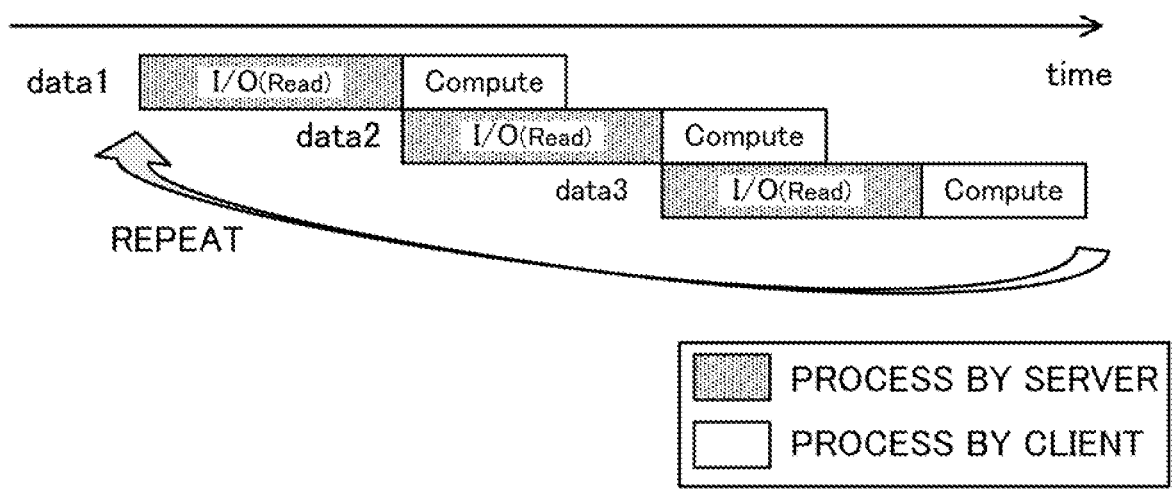
FIG. 1 is a diagram illustrating an example of the operation of a client and a server in time series.

Hereinafter, an embodiment of the present invention will now be described with reference to the accompanying drawings. However, an embodiment described below is merely illustrative and is not intended to exclude the application of various modifications and techniques not explicitly described below. For example, the present embodiment can be variously modified and implemented without departing from the scope thereof. In the drawings to be used in the following description, like reference numbers denote the same or similar parts, unless otherwise specified.

[1] One Embodiment

[1-1] Comparative Example

First, a comparative example of one embodiment will be described. In a hierarchical storage system, a server accesses a storing device in response to requests from multiple clients connected via networks.

Hereinafter, it is assumed that a client sequentially reads data stored in a hierarchical storage system, and performs processing such as machine learning or data mining, for example, image recognition processing.

In this case, the workload in the server differs from the workload in the conventional manual data operation in the following points. Note that the "workload" is information (for example, an indicator) for indicating the processing (work) load of the server or the use state of the resource, and is information correlated with the access tendency from the client that executes the WF (for example, changes in accordance with the access tendency).

The client performs calculation processing on data read from the hierarchical storage system. For the above, a time interval lies from the time when the client; reads data to the time when the client reads the next data, in other words, from the time when the server receives a reading request to the time when the server receives the next reading request.

When the client repeatedly executes processing by the same application, the process time on certain data becomes substantially constant.

In such a workload, each client is assumed to perform the following operation.

(i) At the start of a WF, the client notifies the server of a list of data (multiple pieces) included In multiple pieces of data (hereinafter, sometimes referred to as a "data set") and the order of reading these data pieces. Hereinafter, this notification may be referred to as a "prefetch request".

(ii) The client makes read accesses to the data set in order in the WF. Here, "read access" means that the client transmits a reading request to the server and receives (obtains) the data from the server.

(iii) The client reads certain data, performs processing on the read data, and then transmits a reading request for the next data to the server.

(iv) The client repeatedly executes the WF multiple times.

In such a workload, the server is assumed to perform the following operation.

(I) The server stores, in the order specified by the prefetch request, data from the storing device (SSD, HDD, or TD) into a RAM (Random Access Memory) for temporarily storing the read data.

(II) Upon receipt of a reading request from the client, the server performs one of the following processes (II-1) and (II-2).

(II-1) In cases where the data requested by the reading request is already stored in the RAM, the server reads the data related to the reading request from the RAM, and transmits the read data to the client. The server deletes the data from the RAM.

(II-2) In cases where the data requested by the reading request is not stored in the RAM, the server causes the client to wait, stores the data related to the reading request from the storing device to the RAM, reads the data from the RAM, and transmits the data to the client. The server deletes the data from the RAM.

FIG. 1 is a diagram illustrating an example of the operation of a client and a server in time series. In FIG. 1, the abscissa axis represents time.

In the example of FIG. 1, "I/O (Read)" indicated by hatching is a process that the server performs and corresponds to the above process of (I) and (II) from reception of a reading request for one data piece from the client to the transmission of the data related to the reading request to the client. Further, in the example of FIG. 1, "Compute" indicated by an outline is a process that the client performs, and corresponds to a part of the processing of (ii) and (iii) from the reception of the data relating to the reading request from the server to the execution of the processing on the received data.

A set of processing of "I/O (Read)" and "Compute" is processing for one data piece included in a data set, and the case of FIG. 1 illustrates processing on three data pieces of "data1", "data2" and "data3".

An example of the WF illustrated in FIG. 1 is a moving image process. The client reads the moving image by frame from the server, and reads out the next frame from the server while performing a process such as object detection on the image data of one frame. In this case, a frame corresponds to a data piece, and the entire moving image file corresponds to a data set.

As illustrated in FIG. 1, when the process for the data piece received from the server for "data3" is completed, the client transmits a reacting request for "data1" to the server in order to repeat the process from the head ("data1") of the data set (see (iv) above).

At the end of the WF, in other words, after reading the last data piece specified in the prefetch request, the server moves (rearranges) the entire data set specified in the prefetch request to the SSD. If the data (data set) has already been arranged in the SSD, the server does not have to carry out further process (rearrangement may be omitted).

Figure 2:
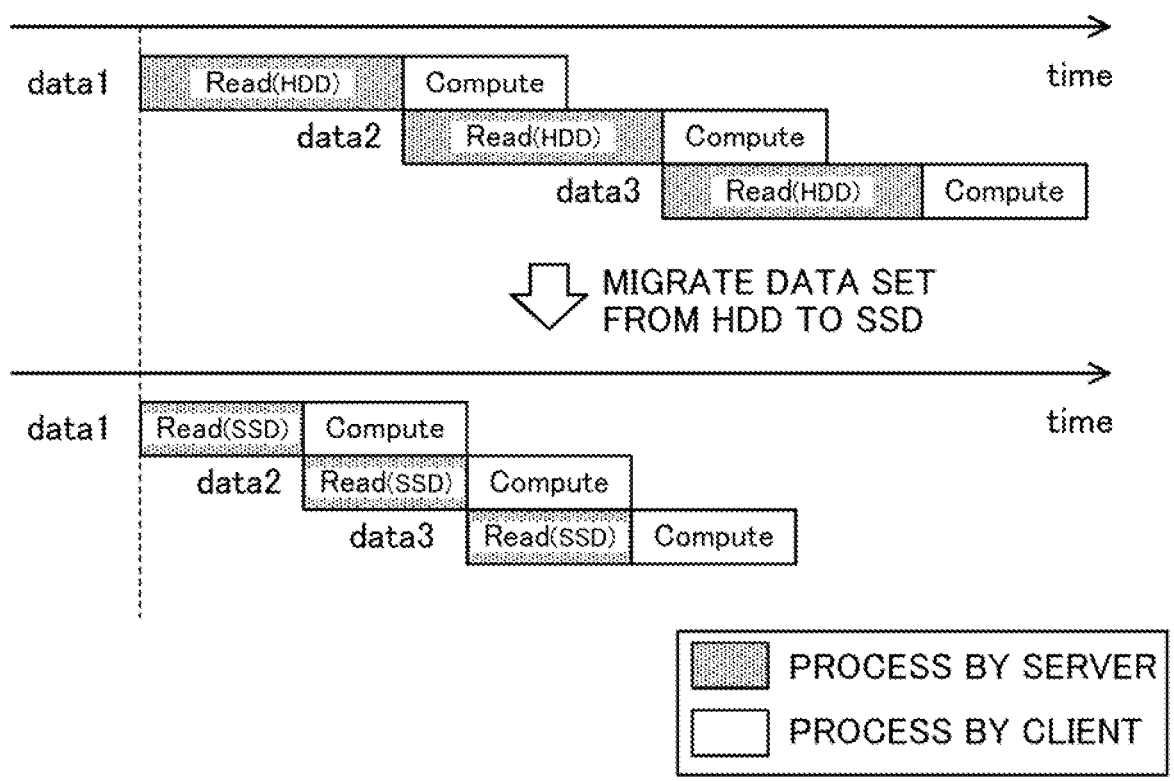
FIG. 2 is a diagram illustrating an example of a case where a server rearranges a data set from a HDD to an SSD after a workflow of FIG. 1.

FIG. 2 is a diagram illustrating an example of a case where the server rearranges a data set from a HDD to an SSD after the WF illustrated in FIG. 1.

As illustrated in FIG. 2, by migrating a data set from a low-speed device such as an HDD (or TD) to a high-speed device such as an SSD, the server can speed up the process of reading the data from the storing device in the second and subsequent WFs. As a result, the time required for completion of WF can be shortened.

Here, the ratio between the time for reading data from the storing device by the server and the time for the process that the client performs on the read data may differ depending on the WFs (in other words, the clients).

Figure 3:
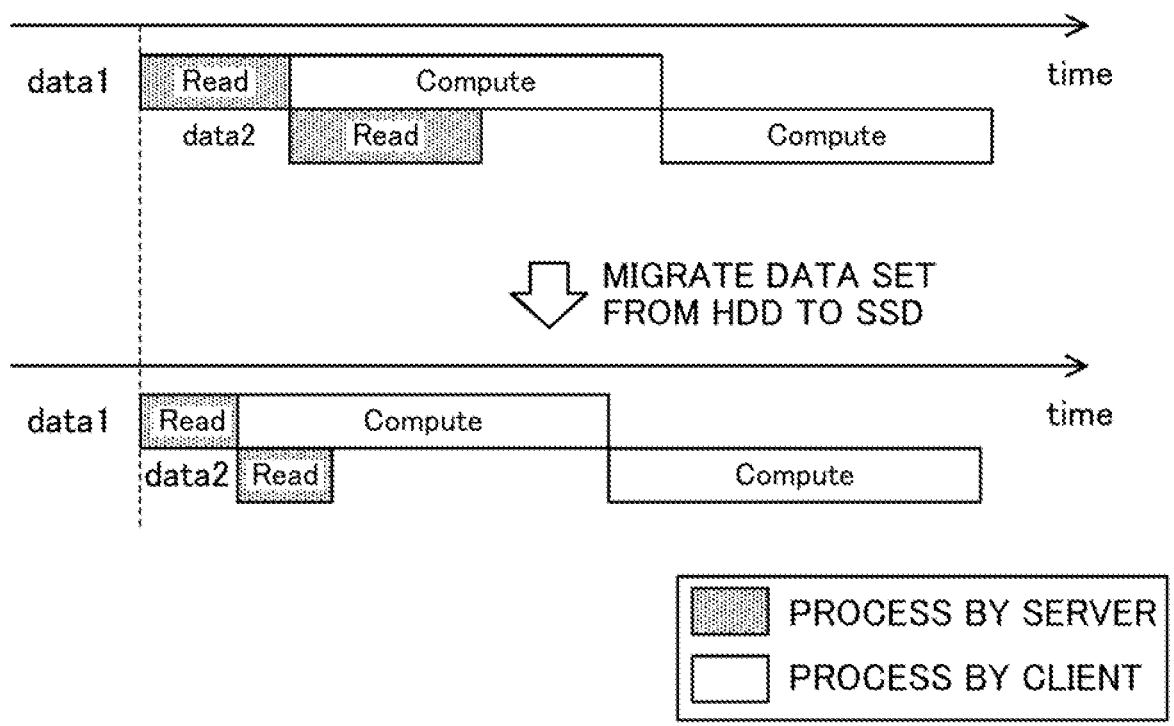
FIG. 3 is a diagram illustrating an example of a case where a server rearranges a data set from a HDD to an SSD after a workflow having a longer process time than that of FIG. 1.

As illustrated in FIG. 3, for example, it is assumed that a WF has a longer process time on data than the example of FIG. 2. First, in cases where the data set accessed by this WF is stored in the HDD of the hierarchical storage system, the server migrates the entire data set to the SSD after the first WF is completed.

As illustrated in FIG. 3, in the case of this workload (WF), the speeding-up of reading an object (data piece; "data1") to be accessed first causes to shortening of the completion time of the entire workload (WF) by a time corresponding to the speeding-up. However, speeding-up the reading of objects to be accessed the next and subsequent (in the examples of FIG. 3, "data2" and subsequent data piece) does not contribute to shortening of the completion time of the entire workload (WF). This is because even if the server reads the "data2" at an earlier timing, the read request of the "data2" from the client is not transmitted unless the process for the previous "data1" is completed in the client, and the server waits for the reading request for the "data2".

As described above, unconditionally migrating a data set to the SSD after completion of the first WF leads to lack of the SSD storage capacity, which is relatively lower in capacity and higher in price than the HDD and the TD. As a result, a data set that expects a large performance improvement effect when being migrated to the SSD fails to be sufficiently arranged in the SSD, and the average performance of all clients accessing the hierarchical storage system may be deteriorated.

As a solution to the above, in one embodiment, a method of determining an appropriate arrangement destination of data in multiple storing devices will now be described.

[1-2] Example of Configuration of One Embodiment

Figure 4:
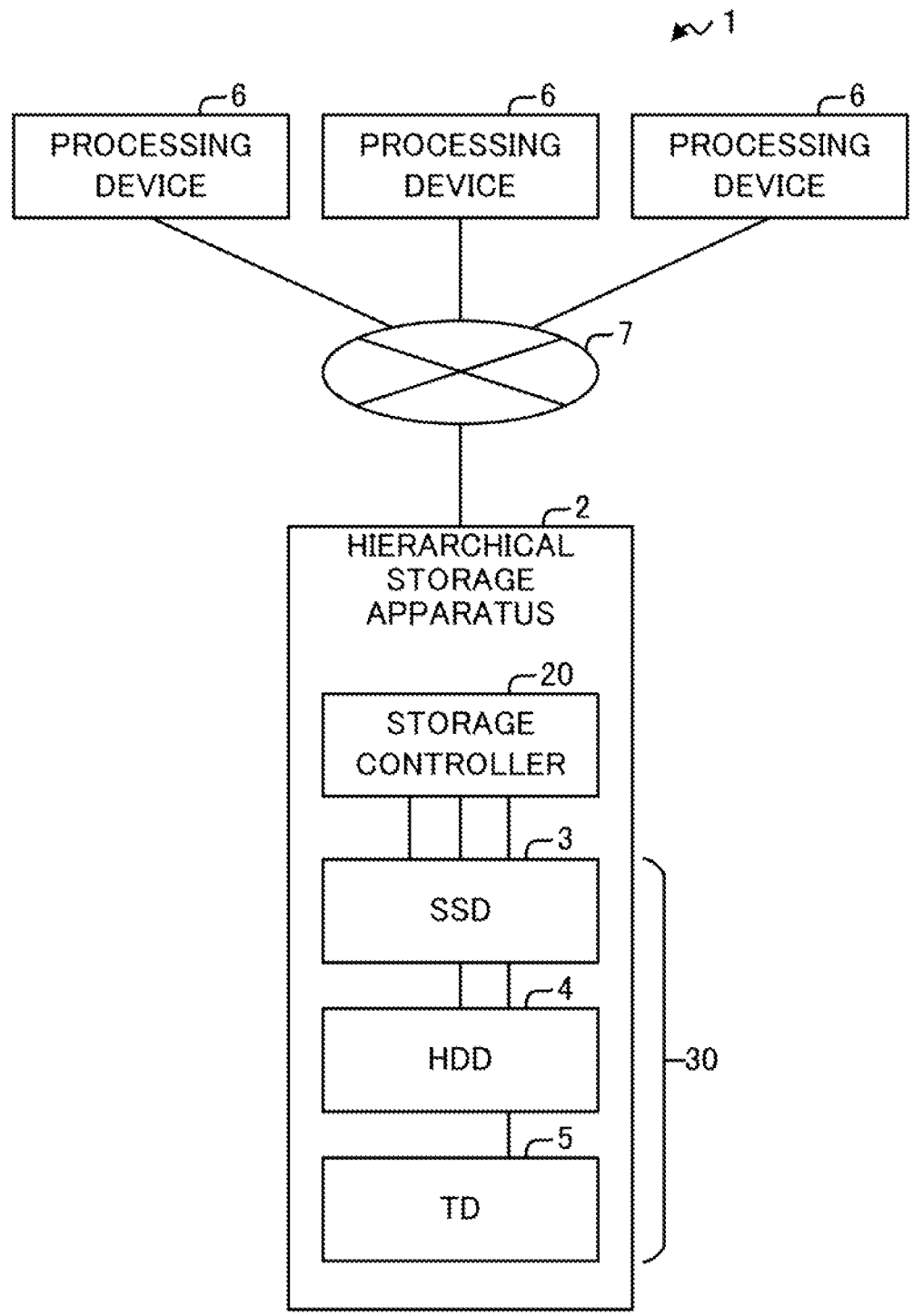
FIG. 4 is a block diagram schematically illustrating an example of the configuration of a hierarchical storage system according to an example of one embodiment.

FIG. 4 is a block diagram schematically illustrating an example of the configuration of a hierarchical storage system 1 as an example of an embodiment. A hierarchical storage system 1 is an example of a storage system or an information processing system. As illustrated in FIG. 4, the hierarchical storage system 1 may illustratively include one or more hierarchical storage apparatuses 2 and multiple processing devices 6. The hierarchical storage system 1 may have one processing device 6.

A hierarchical storage apparatus 2 is an example of a storage apparatus, an information processing apparatus, or a computer. The hierarchical storage apparatus 2 may include one or more storage controller 20, the SSD 3, the HDD 4 and the TD 5, and may provide storage areas of these storing device to multiple processing device 6 by storage controller 20. The SSD 3, the HDD 4 and the TD 5 are examples of multiple types of storage device. Hereinafter, the SSD 3, the HDD 4 and the TD 5 may be collectively referred to as a storage device 30.

The storage controller 20 is an example of a control apparatus, a controller, an information processing apparatus, or a computer, and may be, for example, a Controller Module (CM). The hierarchical storage apparatus 2 may include two or more storage controllers 20 for redundancy and scale-out.

The storage controller 20 is communicably connected to each of multiple storage devices 30 and performs various controls such as access control to the processing device 6 and access control and hierarchical control to the storage device 30. The control performed by the storage controller 20 may include at least part of the processes described above in (I) and (II).

The SSD 3, the HDD 4 and the TD 5 are examples of multiple types of storage device 30 having different performances, in other words, different tires, and are examples of multiple storage tires having different reading performances. The SSD 3, the HDD 4 and the TD 5 may constitute the hierarchical storage.

As illustrated in FIG. 4, examples of the multiple types of storage device 30 include a semiconductor drive device such as the SSD 3, a magnetic disk device such as the HDD 4, and an external recording medium device such as the TD5. The TD5 may be, for example, a tape library device capable of inserting/removing a medium cartridge (recording medium) such as a magnetic tape cartridge or an optical disk cartridge, and reading/writing data from/to the inserted medium cartridge.

The semiconductor drive device is an example of a high-speed storing device which can make a high-speed access. An external recording medium device is an example of a relatively low speed storing device. The magnetic disk drive is an example of a medium-speed storing device which is an example of intermediate accessibility between a high-speed storing device and a low-speed storing device.

Note that the storage device 30 included in the hierarchical storage apparatus 2 is not limited to the one described above, and may be storing devices of two or more types in which at least one of the performance and the storage capacity differs from each other. In addition, in the example of FIG. 4, the hierarchical storage apparatus 2 includes one SSD 3, one HDD 4, and one TD 5, but the present embodiment is not limited thereto, and the hierarchical storage apparatus 2 may include two or more SSDs 3, HDDs 4, and TDs 5.

The storage area provided by the hierarchical storage apparatus 2 may store data to be read and used by executing the application in the processing device 6. The data may be transmitted from the processing device 6 or a non-illustrated computer to the hierarchical storage apparatus 2 and stored in the storage device 30 by the hierarchical storage apparatus 2.

The processing device 6 is an example of an information processing apparatus such as a Personal Computer (PC) or a server, and may include a non-illustrated processor such as a Central Processing Unit (CPU). The processing device 6 may implement various functions by, for example, executing an application on an Operating System (OS) by the processor. In one embodiment, the processing device 6 is assumed to execute the WFs (i) to (iv) described above by the application.

The processing device 6 may execute one or more Virtual Machines (VMs) and may execute the OS in one or more VMs. In this case, the processing device 6 may execute an application on the OS of each of one or more VMs, and thereby cause each application to execute the WFs (i) to (iv) described above.

In this manner, the processing device 6 executes a series of processes (WF) that performs a given process on each of multiple pieces of data included in a data set multiple times, regarding the series of processes as one unit.

As a non-limiting example of a series of processes includes moving image processing in machine learning such as image recognition, and data raining. In this case, a data set is an object to be processed in moving image processing or data mining, and is exemplified by a file. Each data piece included in the data set is data of one unit to undergo a given process in moving image processing or data mining, and is exemplified by image data (frame) in a moving image.

Examples of the given process include object detection and compression/decompression on image data.

The given process may include, in addition to the above process, various processing performed in the same manner (uniformly) as each other for each of given processing units obtained by dividing information treated as one file.

The hierarchical storage apparatus 2 and each of the multiple processing devices 6 may be communicably connected to one another via a network 7. Examples of the network 7 include at least one of a Local Area Network (LAN), a Wide Area Network (WAN), and the Internet.

Furthermore, the network 7 may include a virtual network such as the Virtual Private Network (VPN). The network 7 may also include a Storage Area Network (SAN) via an InterFace (IF) such as a Serial Attached Small Computer System Interface (SAS) or a Fibre Channel (FC).

[1-3] Example of Hardware Configuration

Figure 5:
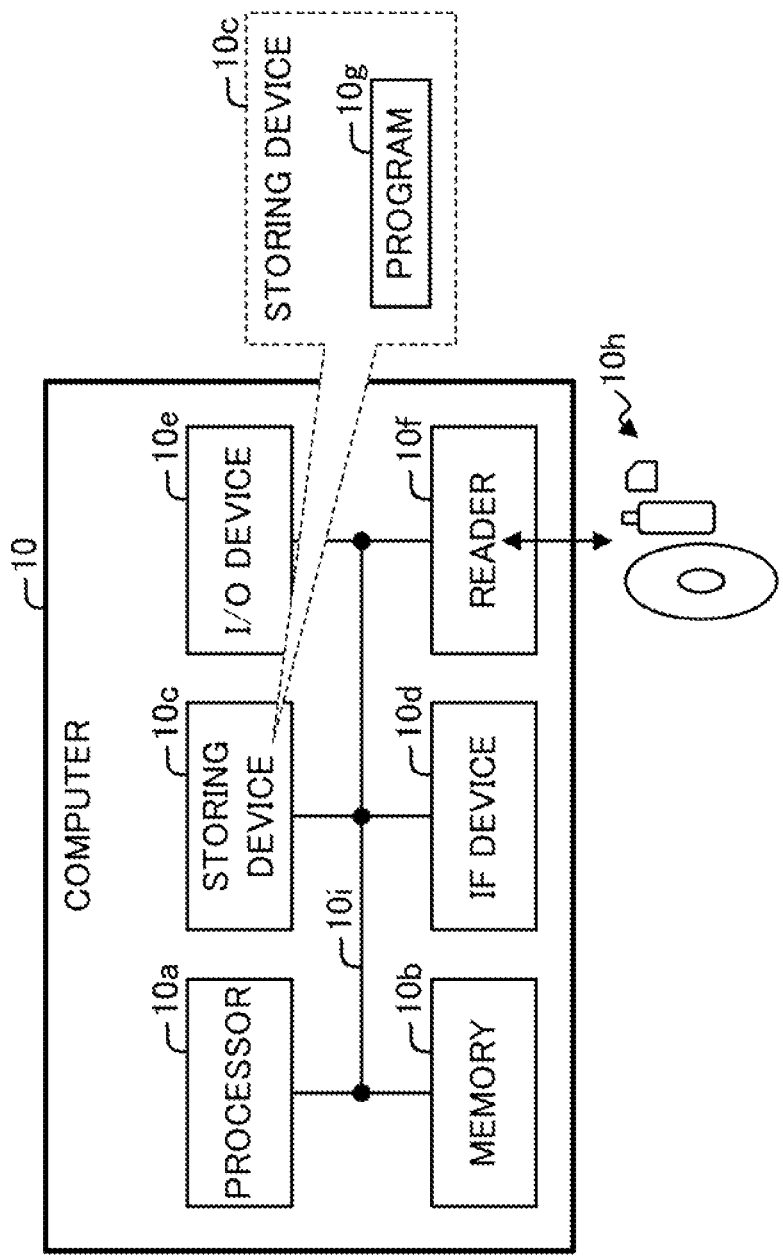
FIG. 5 is a block diagram schematically illustrating an example of the hardware configuration of a computer according to one embodiment.

Next, a description will now be made in relation to an exemplary Hardware (HW) configuration of the storage controller 20 and the processing device 6. Both the storage controller 20 and the processing device 6 may have similar or substantially similar hardware configuration. Hereinafter, an example of the hardware configuration of the storage controller 20 and the processing device 6 will be described by referring to an example of the hardware configuration of a computer 10. FIG. 5 is a block diagram schematically illustrating an exemplary hardware configuration of a computer 10 according to one embodiment.

The computer 10 may include a processor 10a, a memory 10b, a storing device 10c, an IF device 10d, an I/O (Input/Output) unit 10e, and a reader 10f, as a HW configuration.

The processor 10a is an example of a processor that performs various controls and calculations. The processor 10a may be communicably connected to the blocks in the computer 10 via a bus 10i. The processor 10a may be a multiprocessor including multiple processors, may be a multicore processor having multiple processor cores, or may have a configuration having multiple multicore processors.

Examples of the processor 10a include an integrated circuit (IC) such as a CPU, a Micro Processing Unit (MPU), a Graphics Processing Unit (GPU), an Accelerated Processing Unit (APU), a Digital Signal Processor (DSP), an Application Specific IC (ASIC), and an Field-Programmable Gate Array (FPGA).

The memory 10b is an example of hardware that stores information exemplified by various types of data, programs. An example of the memory 10b includes a volatile memory such as Dynamic RAM (DRAM).

The storing device 10c is an example of hardware that stores information exemplified by various types of data, programs, and the like. Examples of the storing device 10c include a magnetic disk device such as a HDD, a semiconductor drive device such as an SSD, and various storing device such as a nonvolatile memory. Examples of the nonvolatile memory include a flash memory, a Storage Class Memory (SCM), and a Read Only Memory (ROM).

The storing device 10c may store a program 10g that implements all or part of various functions of the computer 10. For example, the processor 10a of the storage controller 20 can achieve a function as a storage controller 20 by expanding the program 10g stored in the storing device 10c on a memory 10b and executing the expanded program. In addition, the processor 10a of the processing device 6 can achieve a function as a processing device 6 by expanding a program 10g stored in the scoring device 10c on the memory 10b and executing the expanded program.

The IF device 10d is an example of a communication interface chat controls connection and communication with network (which may include the network 7 of FIG. 4). For example, the IF device 10d may include an adapter compliant with a LAN, or optical communication (e.g., FC). For example, the program 10g may be downloaded from the network to the computer 10 via the communication interface and stored into the storing device 10c.

The IF device 10d of the storage controller 20 may include, in addition to the communication IF for the network 7, one or more communication IFs compatible one with each of the SSD 3, the HDD 4 and the TD 5, or a communication IF for another storage controller 20 redundantly provided.

The I/O device 10e may include one or both of an input device, such as a mouse, a keyboard, or an operating button, and an output device, such as a touch panel display, a monitor, such as a Liquid Crystal Display (LCD), a projector, or a printer.

The reader 10f is an example of a reader that reads data and programs recorded on the recording medium 10h. The reader 10f may include a connecting terminal or device to which the recording medium 10h can be connected or inserted. Examples of the reader 10f include an adapter conforming to, for example, Universal Serial Bus (USB), a drive apparatus that accesses a recording disk, and a card reader that accesses a flash memory such as an SD card. The program 10g may be stored in the recording medium 10h, and the reader 10f may read the program 10g from the recording medium 10h and store the program 10g into the storing device 10c.

An example of the recording medium 10h includes a non-transitory recording medium such as a magnetic/optical disk and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a USB memory, and an SD card. Examples of the CD include a CD-ROM, a CD-R, and a CD-RW. Examples of the DVD include a DVD-ROM, a DVD-RAM, a DVD-R, a DVD-RW, a DVD+R, and a DVD+RW.

The hardware configuration of the computer 10 described above is merely illustrative. Accordingly, the computer 10 may appropriately undergo increase or decrease of hardware (e.g., addition or deletion of arbitrary blocks), division, integration in an arbitrary combination, and addition or deletion of the bus.

For example, in a computer 10 serving as a storage controller 20, at least one of I/O device 10e and reader 10f may be omitted. The computer 10 serving as the storage controller 20 may use at least one of storage device 30 (SSD 3, HDD 4, and TD 5) as the storing device 10c.

[1-4] Example of Functional Configuration

Figure 6:
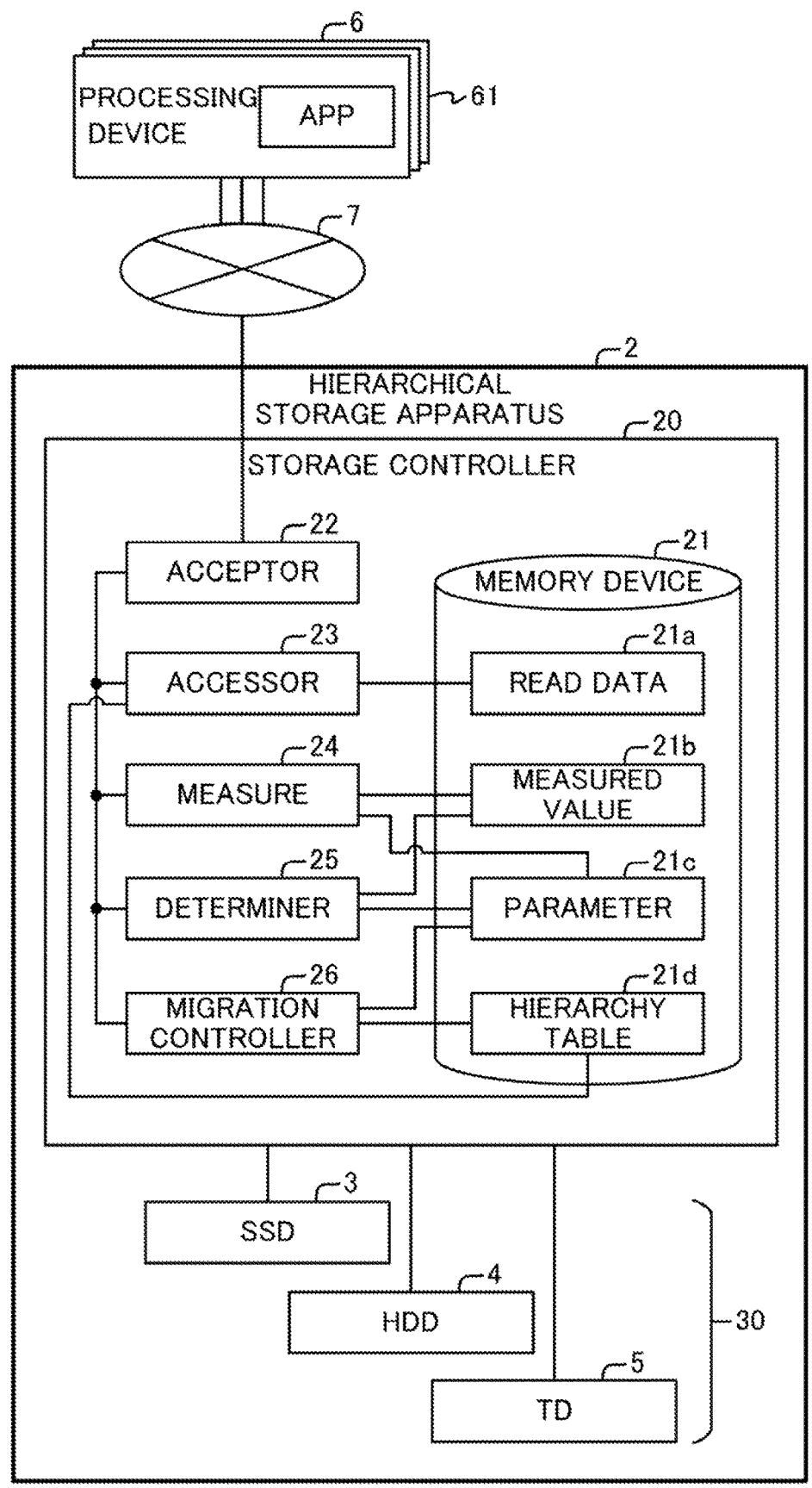
FIG. 6 is a block diagram schematically illustrating an example of the functional configuration of a storage controller as an example of one embodiment.

FIG. 6 is a block diagram schematically illustrating an example of the functional configuration of the storage controller 20 of an example of one embodiment. FIG. 6 is a diagram focusing on the functional configuration when reading data from a processing device 6 makes a reading access to data of a hierarchical storage apparatus 2. The storage controller 20 may illustratively include a memory device 21, an acceptor 22, an accessor 23, a measure 24, a determiner 25 and a migration controller 26.

The memory device 21 stores various information to be used for controlling the storage controller 20. The memory device 21 may include multiple storage areas and may illustratively store read data 21a, a measured value 21b, a parameter 21c and a hierarchy table 21d into the storage areas. The memory device 21 may be achieved by a storage area included in at least one of the memory 10b and the storing device 10c illustrated in FIG. 5.

For example, the acceptor 22 receives a prefetch request and a reading request from an application (denoted by "APP" in FIG. 6) 61 executed by the processing device 6, obtains information such as the type and the content of the received request, and transmits (outputs) the obtained information to the accessor 23. Upon receipt of read data 21a from the accessor 23 to be described below, the acceptor 22 transmits the data to the processing device 6 in response to the reading request.

The prefetch request is transmitted from the processing device 6 at the timing when a WF is started and is received by the acceptor 22. The prefetch request may include a data list of the data pieces included in the data set and a reading order of multiple data pieces specified in the data list. In cases were the WF is repeatedly executed, the application 61 may transmit the prefetch request at respective timings at which the WF is started, or may transmit the prefetch request at a timing at which the WF is started for the first time.

The reading request is transmitted from the processing device 6 at the timing of instructing a prefetch of data (the timing at which the WF starts or the timing at which the process on the immediately preceding data is completed), and is received by the acceptor 22. The reading request may include information that specifies a data piece to be read among the multiple data pieces included in the data list.

Since the reading order of the data pieces from the data set is specified by the prefetch request, the information specifying the data piece to be read may be information that specifies the entry of the data piece to be read from the data list included in the prefetch request. Alternatively, since it is known that the unread data pieces in the data list are to be read in the order of reading, the information specifying the data to be read may simply be a prefetch request or the information specifying the data set.

As described above, the acceptor 22 is an example of a receiver that receives a reading request for the first, data piece among the multiple data pieces from the processing device 6.

The accessor 23 reads data pieces from the storage device 30 in the order specified by the prefetch request, and stores the read data piece, as the read data 21a, into a memory device 21 that is an example of the RAM.

Upon receipt of a reading request, the accessor 23 determines whether or not the data piece that is to be read and that is specified by the reading request is stored in the memory device 21 (i.e., whether or not the data piece has been prefetched).

In cases where the data to be read is already stored in the memory device 21, the accessor 23 reads the read data 21a to be read from the memory device 21 and outputs the read data 21a to the acceptor 22.

On the other hard, in cases where the data to be read is not stored in the memory device 21, the accessor 23 reads the data piece to be read from the storage device 30, and stores the read data piece as the read data 21a into the memory device 21. Then, the accessor 23 reads the read data 21a to be read from the memory device 21, and transmits (outputs) the read data 21a to the acceptor 22.

After transmitting the read data 21a to the acceptor 22, the accessor 23 deletes the read data 21a from the memory device 21.

Here, the accessor 23 may specify the storage device 30 (SSD 3, HDD 4 or TD 5) in which the data piece to be read is stored (arranged) by referring to the hierarchy table 21d stored in the memory device 22.

FIG. 7 is a diagram illustrating an example of the hierarchy table 21d. The hierarchy table 21d is information indicating a storage device 30 in which each of multiple pieces of data included in a data set (e.g., a file) is stored (arranged). FIG. 7 illustrates the hierarchy table 21d in a table format, but the present embodiment is not limited to this. Alternatively, the hierarchy table 21d may be stored in a memory device 21 in various forms such as an array or a DataBase (DB).

The hierarchy table 21d may illustratively include information specifying a data set and a data piece, information specifying a storage device 30 in which each data piece is stored, and information indicating a storing position (storage location) of the data piece in the storage device 30.

In the example of FIG. 7, the hierarchy table 21d may include a data ID (Identifier), a storing destination, and a scoring position. In the data ID, information that can specify the data set and the data piece in the data set may be set. As exemplarily illustrated in FIG. 7, an ID obtained by combining the ID "ds1" of the data set and the ID "data00001" of the data piece in the data set may be set in the data ID. The data ID is not limited to this, and alternatively a logical address (e.g., a Logical Block Address (LBA)) at the head of the corresponding data may be set as the data ID.

Identification information of a storage device 30 in which the data piece is stored may be set as the storing destination. In the storing position, information that can specify the position storing the data piece in the storage device 30 may be set. For example, a physical address on a volume or an offset corresponding to the size of a block, a segment or the like may be set for the storing position of the SSD 3 or the HDD 4. In addition, for example, a volume number of at least one of the Logical volume (LV) and the Physical Volume (PV) allocated to a storage medium may be set for the storing position of the TD 5.

The accessor 23 may specify the storage device 30 of the storing destination of the data piece to be read by referring to the hierarchy table 21d, and read the data piece to be read from the storing position.

The hierarchy table 21d may be updated in response to, for example, a data rearrangement process performed by the migration controller 26 to be detailed below.

As described above, the acceptor 22 and the accessor 23 collectively function as an example of a transmitter that reads the first data piece from the first storage tier that stores the first data piece among multiple storage tiers, and transmits the read first data piece to the processing device 6 in response to a reading request.

The measure 24 measures, for each data piece included in the data set, a process time for which the processing device 6 takes in executing the WF on the data piece, and stores the measured result as a measured value 21b into the memory device 21. In cases where the storage controller 20 processes multiple WFs with one or more processing device 6, the memory device 21 may store the measured value 21b for each WF.

FIG. 8 is a diagram illustrating an exemplary measured value 21b. As illustrated in FIG. 8, in the memory device 21, the measured value 21b including the process time $T_P(i)$ may be stored for each WF (WF#0, KF#1, . . . ). Assuming that the total number of data piece included in a data set is N, and the i-th data piece included in the data set (i-th read data piece in the WF) is $d_i$, the processing time $T_P(i)$ means the time that the processing device 6 that executes the same WF takes in processing the data piece $d_i$. Here, i is an integer of 1 or more, and equal to or less than N.

For example, the measure 24 may calculate the process time $T_P(i)$ by calculating the following Expression (1).

$$\text{process time } T_P(i) = \text{Time } A - \text{Time } B \quad (1)$$

Where Time A means a time at which a read request for a data piece $d_{i+1}$ was received from the processing device 6, and Time B means a time at which the data piece $d_i$ was sent to the processing device 6.

In the above Expression (1), the Time B (the time at which the data piece $d_i$ was transmitted to the processing device 6) is estimated to be the time at which the data piece $d_i$ has become usable by the processing device 6. In the above Expression (1), the Time A (the time at which the reading request for the data piece $d_{i+1}$ was received from the processing device 6) is estimated to be the time at which the processing device 6 requests the next data piece $d_{i+1}$, that is, the time at which the processing device 6 completes the process on the data piece $d_i$.

As a result, the measure 24 can estimate (approximate) the time during which the processing device 6 could perform processing on the data piece $d_i$, which eliminates the need to obtain the actual measured value of the process time from the processing device 6, and can obtain the process time $T_P(i)$ easily. Therefore, it is possible to suppress an increase in processing load of the processing device 6 for obtain the actual measured value, an increase in the communication load of the network 7, and the like.

For a WF repeatedly executed by a certain processing device 6, the measure 24 may measure (calculate) the process time $T_P(i)$ for each data piece $d_i$ included in the data set of the WF target during the execution of the WF for the first time.

The timing of mass wring the process time $T_P(i)$ by the measure 24 is not limited to this, and alternatively the process time $T_P(i)$ may be measured each time WF is executed in consideration of the possibility that the process time $T_P(i)$ changes each time a WF is executed.

As described above, the measure 24 is an example of a measuring unit that measures the process time $T_P(i)$ that the processing device 6 takes in executing a given process. The measuring unit calculates the process time $T_P(i)$ based on the receiving time $T_D(i)$ at which the acceptor 22 has received a reading request for the i-th data piece and the transmitting time at which the acceptor 22 and the accessor 23 have transmitted the (i–1)-th data piece of the multiple data pieces to the processing device 6.

On the basis of the measured value 21b measured by the measure 24 and parameter 21c, the determiner 25 determines the tier of the storage device 30 for arranging (rearranging) each data piece included in the data set of the target, for the WFs, and notifies the migration controller 26 of the determination result. That is, the determiner 25 makes a determination to arrange (rearrange) the data set to be processed in an appropriate storage device 30 in units of data piece.

The determiner 25 may perform the determination after the WF whose process time $T_P(i)$ has been measured by the measure 24, among WFs to be repeatedly executed by a certain processing device 6 is executed. For example, in cases where the process time $T_P(i)$ by the measure 24 is measured each time the WF is executed, the determiner 25 may make the determination each time the WF is executed, in other words, after the WF is completed and before the next WF is executed.

The migration controller 26 controls the migration of data between hierarchies in multiple storage device 30 based on the notification from the determiner 25. For example, upon receipt of a notification of the result of the determination that the migration destination of a certain data piece is the SSD 3 from the determiner 25, the migration controller 26 migrates (rearranges) the data piece from the storage device 30, which is the present storing destination, to the SSD3. In addition, the migration controller 26 updates the contents of the storing destination and the storing position of the entry of the data piece in the hierarchy table 21d to the information of the destination to which the data is to be migrated (rearranged).

The migration controller 26 may suppress the migration control in cases where the migration destination of the data piece related to the notification is the same tier (e.g., the same performance) as the present storing destination. Alternatively, in cases where the determined destination of the data piece is the same tier as the present storage destination, the determiner 25 may suppress the notification of the result of the determination to the migration controller 26.

The data migration control by the migration controller 26 may be performed, for example, when a notification that all the data pieces included in the data set have been received from the determiner 25 (when the WF is completed), on all data included in the data set.

The data migration control by the migration controller 26 nay be executed in a unit of data piece based on a received notification each time the notification related to each data piece is received from the determiner 25 for each data piece (i.e, while the WF is being executed).

As described above, the migration controller 26 is an example of a migrator that migrates the first data piece from the first storage tier to a storage tier determined by the determiner 25.

[1-5] Determiner

Next, the above-described determiner 25 will now be described. On the basis of a measured value 21b and a parameter 21c, the determiner 25 determines the tire of the storage device 30 of the migration destination (arrangement destination) for each data piece.

FIG. 9 is a diagram illustrating an exemplary parameter 21c. As illustrated in FIG. 9, the parameter 21c may include values of N, $d_i$, $S_i$, $B_D$, $T_{I/O}(i)$, $t_S(i)$, $t_F(i)$, and $t_D(i)$. The parameter 21c may store these values in a memory device 21 (e.g., memory 10b) in the form of, for example, variables, or arrays. The values of N and $d_i$ are as described above and the other symbols represent the following parameters:

$S_i$: size of data piece $d_i$ $B_D$: reading performance of a device D serving as a storing destination of a data set $T_{I/O}(i)$: reading time period that the storage controller 20 takes to read the data piece $d_i$ $t_S(i)$: time at which the storage controller 20 starts reading the data piece $d_i$.

$t_F(i)$: time at which the storage controller 20 completes reading the data piece $d_i$.

$t_D(i)$: time at which the storage controller 20 receives a reading request for the data piece $d_i$ from the processing device 6.

In the above explanation, the device D indicates one of the SSD 3, the HDD 4 or the TD 5 in which the data set is stored. The $B_D$ may include the reading performance $B_{SSD}$ of the SSD 3, the reading performance $B_{HDD}$ of the HDD 4, and the reacting performance $B_{TD}$ the TD 5, all of which are assumed to be known values.

In addition, all the value of N, $d_i$, and $S_i$ can be obtained in the storage controller 20 after the timing at which when the data set is stored into the storage device 30.

Furthermore, in cases where the data piece $d_i$ is stored in the device D, the $T_{I/O}(i)$ can be calculated by the following Expression (2). The parameter 21c may include $T_{I/O}(i)$ in each instance of the $B_{SSD}$, the $B_{HDD}$, and the $B_{TD}$.

$$T_{I/O}(i) = S_i/B_D \tag{2}$$

The values of N, $d_i$, and $S_i$ in the parameter 21c may be set, for example, prior to the process performed by the determiner 25 (e.g., concurrently with or after the timing at which the data set is stored into the storage device 30). In addition, the values of the $B_D$, the $T_{I/O}(i)$ in the parameter 21c may be set prior to the process performed by the determiner 25 (e.g., after the storage controller 20 is started), for example.

Here, as described with reference to FIG. 3, in the case of the workload assumed in one embodiment, even if the storage controller 20 reads "data2" from the SSD 3 at an early timing, waiting for a read request for "data2" issued from the processing device 6 may occur. On the other hand, since the storage controller 20 arranges the "data2" in a low-speed HDD 4 or the TD 5, the process for the "data1" by the processing device 6 is completed prior to the completion of the reading of the "data2", and the waiting for the "data2" may occur in the processing device 6.

As a solution to the above, the determiner 25 estimates the time at which the processing device 6 accesses the i-th data piece in the data set related to the WF, on the basis of the process time $T_P(i)$ measured by the measure 24 and the values of the parameter 21c. Then, the determiner 25 determines an appropriate arrangement destination of the data piece $d_i$ based on the relationship between the estimated time and the time at which the accessor 23 completes the reading of the data piece $d_i$ from the storage device 30.

For this purpose, the determiner 25 may calculate the values of $t_S(i)$, $t_D(i)$, and $t_F(i)$ based on the process times $T_P(i)$ and the values of N, $d_i$, $S_i$, $B_D$, $T_{I/O}(i)$ in the parameter 21c as follows. Note that, the first data piece $d_1$ is defined as $t_S(1)=0$.

Note that the processing time $T_P(i)$ is an actual measured value by the measure 24 during the execution of the WF, whereas the following values of $t_S(i)$, $t_D(i)$, and $t_F(i)$ are calculated values that the determiner 25 calculates using the process time $T_P(i)$.

For example, for the calculation of the values of $t_S(i)$, $t_D(i)$, and $t_F(i)$, the values such as $t_D(i-1)$ and $t_F(i-1)$ obtained in the calculation one time before are used as described below. In this manner, the calculated values of $t_S(i)$, $t_D(i)$, and $t_F(i)$ may be regarded as estimated values (simulated values) estimated by using the previous calculation results. Therefore, the values of $t_S(i)$, $t_D(i)$, and $t_F(i)$ may be regarded as the estimated starting time of reading the data piece $d_i$, the estimated receiving time $t_D(i)$ of a reading request for the data piece $d_i$, and the estimated completion time $t_F(i)$ of reading the data piece $d_i$, respectively.

In one embodiment, since it is assumed that data pieces in a subset are read sequentially, the relationship represented by the following Expression (3) can be satisfied for $t_S(i)$.

$$t_S(i) = t_F(i-1) \text{ (where } i \geq 2\text{)} \tag{3}$$

The determiner 25 may calculate the value $t_D(i)$ by the following Expression (4) obtained by modifying the above Expression (1).

$$t_D(i) = \max(t_D(i-1), t_F(i-1)) + T_P(i-1) \tag{4}$$

Further, the determiner 25 may calculate $t_F(i)$ by the following Expression (5).

$$t_F(i) = t_S(i) + T_{I/O}(i) \tag{5}$$

Here, the max operator in the above Expression (4) is an operator that selects the larger one of the values of $t_D(i-1)$ and $t_F(i-1)$. Hereinafter, the max operator of the above Expression (4) will now be described.

(in a case where $t_D(i-1) > t_F(i-1)$)

Figure 10:
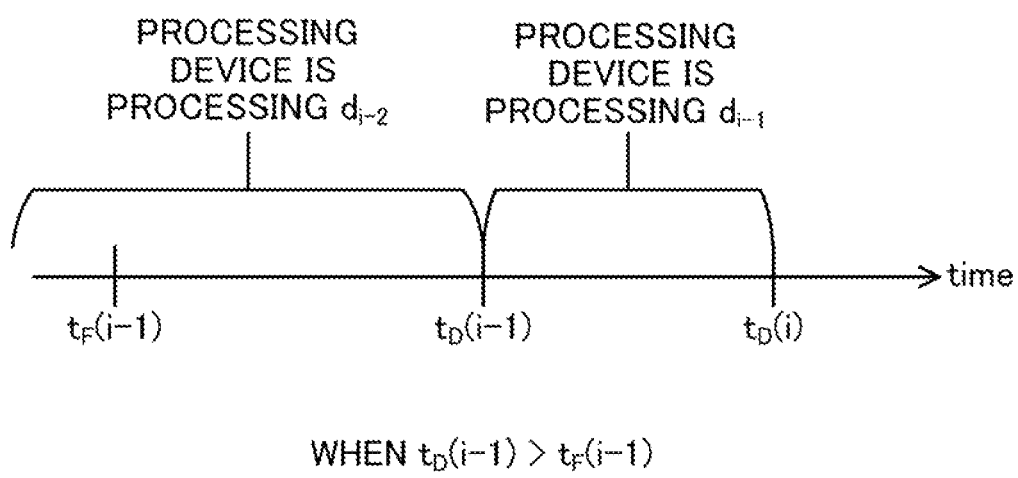
FIG. 10 is a diagram illustrating an example of relationship between an operation states and a parameter of a processing device.

$t_D(i-1) > t_F(i-1)$ means that the reading of the data piece $d_{i-1}$ by the accessor 23 is completed while the processing device 6 performs a process on the data piece $d_{i-2}$, as illustrated in FIG. 10.

In this instance, the timing at which the processing device 6 transmits a reading request for the data piece $d_i$ to the storage controller 20 is the timing at which all of the following (a) to (c) are completed (see FIG. 10).

(a) The processing device 6 completes the process on the data piece $d_{i-2}$.

(b) The processing device 6 sends a reading request for a data piece $d_{i-1}$ to the storage controller 20.

(c) The processing device 6 completes the process on the data piece $d_{i-1}$.

Therefore, in cases where $t_D(i-1) > t_F(i-1)$, max $(t_D(i-1), t_F(i-1)) = t_D(i-1)$ is satisfied (see FIG. 10).

in a case where $(t_D(i-1) > t_F(i-1))$

Figure 11:
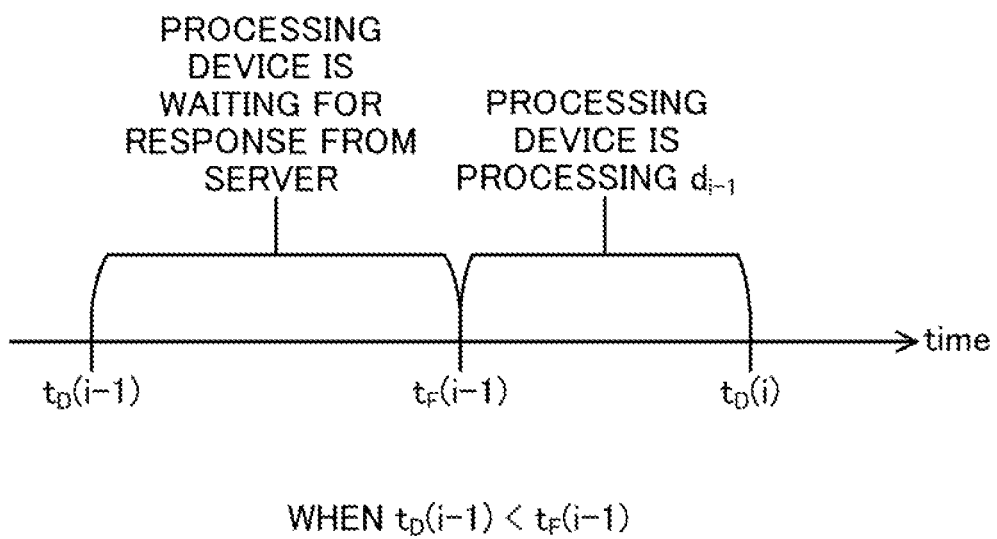
FIG. 11 is a diagram illustrating an example of relationship between an operation states and a parameter of a processing device.

As illustrated in FIG. 11, $t_D(i-1) > t_F(i-1)$ means that, before the accessor 23 completes the reading of the data piece $d_{i-1}$, the processing device 6 has completed a process on the data piece $d_{i-2}$ and sent a reading request for the data piece $d_{i-1}$ to the storage controller 20.

In this instance, the timing at which the processing device 6 transmits a read request to the storage controller 20 is the timing at which the following (d) and (e) both completed (see FIG. 11).

(d) The server has completed reading of the data piece $d_{i-1}$, and the accessor 23 sends the data piece $d_{i-1}$ to the processing device 6.

(e) The processing device 6 completes a process on the data $d_{i-1}$.

Therefore, in cases where $t_D(i-1) > t_F(i-1)$, max $(t_D(i-1), t_F(i-1)) = t_D(i-1)$ is satisfied (see FIG. 11).

The determiner 25 may set the calculated $t_S(i)$, $t_D(i)$, and $t_F(i)$ to the parameter 21c of a corresponding WF.

Next, an exemplary process of determining the arrangement destination of the i-th data piece by the determiner 25 on the basis of the above Expressions (3) to (5) will now be described.

(in a case where i=1)

The determiner 25 determines that the data piece $d_1$ is to be arranged in the SSD 3, which has the highest accessibility. This is because the accessor 23 waits for the processing device 6 while reading the first data piece in a data set to be processed by a WF.

The determiner 25 may calculate the following Expressions (6) to (8) by substituting i=1 into the above Expressions (3) to (5), respectively, to obtain the values of $t_S(1)$, $t_D(1)$, and $t_F(1)$.

$$t_S(1) = 0 \tag{6}$$

$$t_D(1) = \max(t_D(0), t_F(0)) + T_P(0) = 0 \tag{7}$$

$$t_F(1) = t_S(1) + T_{I/O}(1) = S_1/B_{SSD} \tag{8}$$

In the above Expression (6), the value of $t_S(1)$ becomes "0" as defined above. In the above Expression (7), the values of $t_D(0)$, $t_F(0)$, and $T_P(0)$ do not exist, and are all become "0", which results in that $t_D(1)$ equals "0". The determiner 25 may omit the calculation of the values $t_S(1)$ and $t_D(1)$ which are known to be "0".

In the above Expression (8), since the value $t_S(1)$ is "0" from the above Expression (6), the value $t_F(1)$ coincides with $T_{I/O}(1)$, which is the time taken for the accessor 23 to read the data piece $d_1$ from the SSD 3.

(in a case where i=2)

The determiner 25 calculates the following Expressions (9) to (11) by substituting the values of i=2 and parameter 21c into the above Expressions (3) to (5), respectively. For example, the determiner 25 may calculate $t_F(2)$ in cases where each of the $B_{SSD}$, the $B_{HDD}$, and the $B_{TD}$ is used as a $B_D$ of $T_{I/O}(2)$ (=$S_2/B_D$) in the calculation of the following Expression (11) below.

$$t_S(2)=t_F(1) \qquad (9)$$

$$t_D(2)=\max(t_D(1), t_F(1))+T_P(1)=t_S(2)+T_P(1) \qquad (10)$$

$$t_F(2)=t_S(2)+T_{I/O}(2) \qquad (11)$$

In the above Expression (10), the value of $t_F(1)$ is $t_S(2)$ from the above Expression (9), while $t_D(1)$ is the receiving time of a reading request for the first data piece $d_1$ and is prior to the $t_S(2)$, so that $\max(t_D(1), t_F(1))$ comes to be $t_S(2)$.

The determiner 25 determines whether or not there is a device D is present satisfying $t_F(2) \leq t_D(2)$ is present from the above Expressions (10) and (11), and determines the storage device 30 of the arrangement destination of the data piece $d_2$ in accordance with the determination result in the following manner. The determiner 25 may determine the storage device 30 by using the $t_F(2)$ when each of the each $B_{SSD}$, the $B_{HDD}$, and the $B_{TD}$ is used.

(in a case where a device satisfying $t_F(2) \leq t_D(2)$ is present)

Figure 12:
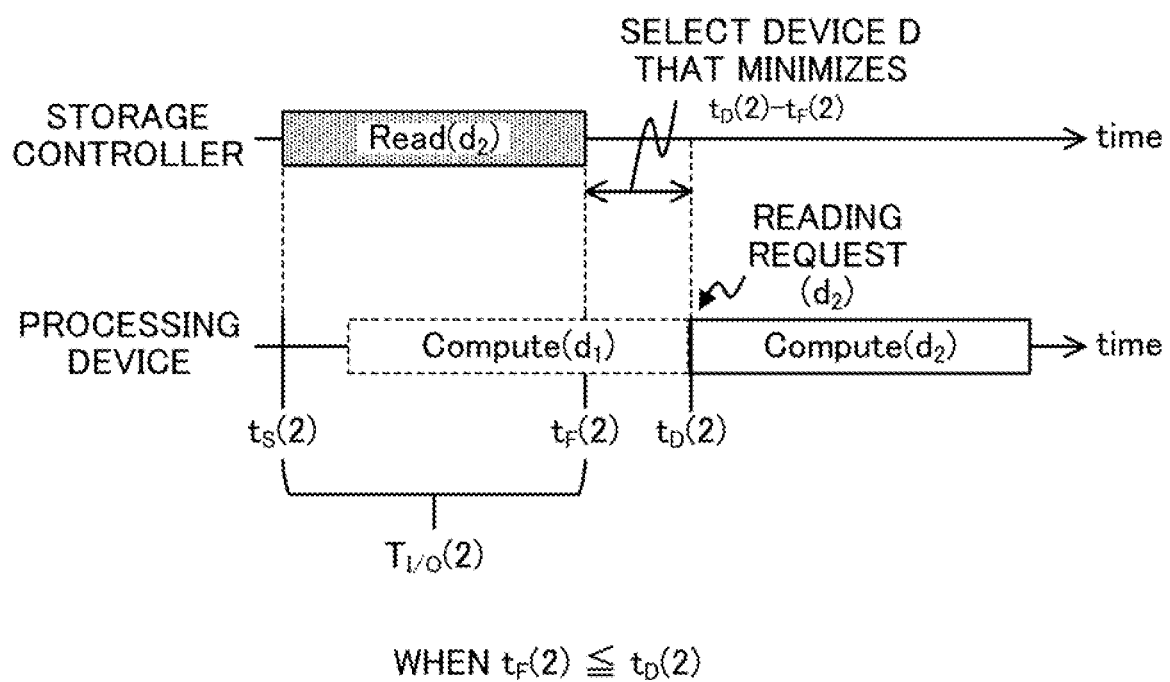
FIG. 12 is a diagram illustrating an example of a determination process by the determination unit.

As illustrated in FIG. 12, in cases where the calculation results of the Expressions (10) and (11) satisfy $t_F(2) \leq t_D(2)$, the process on the immediately preceding data $d_1$ in the processing device 6 is not completed at the time of completion of reading the data $d_2$ by the accessor 23.

This means that the storage device 30 (e.g., SSD 3) that stores the data piece $d_2$ is of excessively high performance (fast). Since the volume of the storage device 30 is constrained by storing the data piece $d_2$ in the overengineered storage device 30, a data set or a data piece which can be expected to improve the performance by being migrated to the storage device 30 is difficult to be sufficiently arranged in the storage device 30. This may degrade the average performance of all the processing device 6 accessing the hierarchical storage apparatus 2.

Therefore, the determiner 25 selects the device D having the smallest $t_D(2)-t_F(2)$ among the devices D satisfying $t_F(2) \leq t_D(2)$ as the storage device 30 of the arrangement destination of the data piece $d_2$.

As a result, a storage device 30 (e.g., HDD 4 or TD 5) that takes longer to read the data piece $d_2$ by the accessor 23 (having a lower access performance) is selected as the storage device 30 of the arrangement destination of the data piece $d_2$ as compared with in the case illustrated in FIG. 12. Therefore, the $t_F(2)$ which is the reading completion time of the data piece $d_2$ can be made close to the receiving time $t_D(2)$ of the reading request for the data piece $d_2$ from the processing device 6 (in other words, the process completion time of the data piece $d_1$ by the processing device 6), and the data piece $d_2$ can be arranged in an appropriate storage device 30.

(in a case where a device satisfying $t(2) \leq t_D(2)$ is not present)

Figure 13:
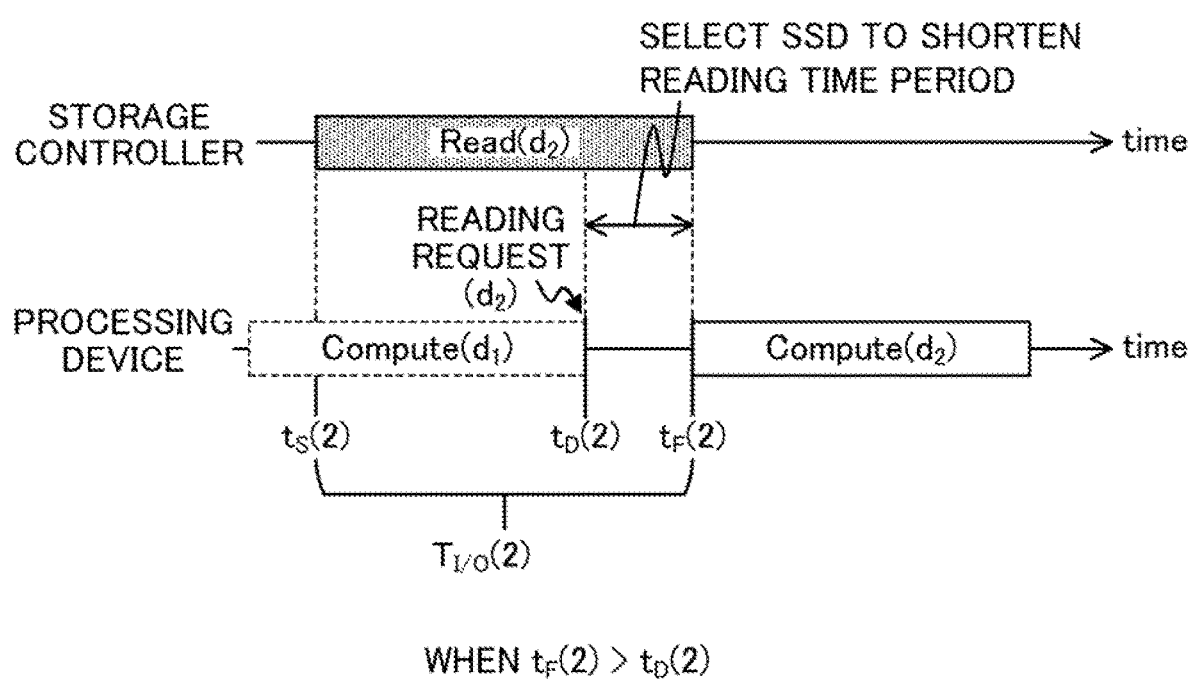
FIG. 13 is a diagram illustrating an example of a determination process by the determination unit.

As illustrated in FIG. 13, in cases where the calculation results of the above Expression (10) and (11) do not satisfy $t_F(2) \leq t_D(2)$, the reading of the data piece $d_2$ by the accessor 23 is not completed at the time of receiving a reading request for the data piece $_2$ issued from the processing device 6.

This means that the performance of the storage device 30 (e.g., HDD 4) storing the data piece $d_2$ does not have a sufficient performance, which means that the process on the data $d_2$ by the processing device 6 delays. Consequently, the storage device 30 becomes a bottleneck, and lowers the throughput of the processing device 6.

In order to shorten the reading time of the data piece $d_2$, the determiner 25 selects a storage device 30 having a high access performance (e.g., a SSD 3 having the highest access performance) as a storage device 30 of the arrangement destination of the data piece $d_2$.

As a result, a storage device 30 (e.g., SSD 3) from which the accessor 23 takes a shorter time to read the data piece $d_2$ (i.e., having a higher accessing performance) than that in the case illustrated in FIG. 12 is selected as the storage device 30 of the arrangement destination of the data piece $d_2$. Therefore, the $t_F(2)$ which is the reading completion time of the data piece $d_2$ can be made close to the receiving time $t_D(2)$ of the reading request of the data piece $d_2$ from the processing device 6, and the data piece $d_2$ can be arranged in an appropriate storage device 30.

(in a case where i≤3)

The determiner 25 calculates the values of $t_S(i)$, $t_D(i)$, and $t_F(i)$ by substituting i (where 3≤i≤N) and the values of parameter 21c into the above Expressions (3) to (5).

The processes of calculating values of $t_S(i)$, $t_D(i)$, and $t_F(i)$ and selecting the storage device 30 of the rearrangement destination of the data piece $d_1$ by the determiner 25 are the same as those performed when i=2.

For example, the determiner 25 may determine whether or not a device D satisfying the relationship $t_F(i) \leq t_D(i)$ with respect to the calculated values of $t_D(i)$ and $t_F(i)$, and may determine the storage device 30 of the arrangement destination of the data piece $d_i$ in accordance with the determination result. Also in a case where when i≤3, the determiner 25 may make a determination by using the $t_F(i)$ when each of the $B_{SSD}$, the $B_{HDD}$, and the $B_{TD}$ is used.

In cases where a device D satisfying $t_F(i) \leq t_D(i)$ is present, the determiner 25 selects the device D having the smallest $t_D(i)-t_F(i)$ among the devices D satisfying $t_F(i) \leq t_D(i)$ as the storage device 30 of the arrangement destination of the data piece $d_i$.

On the other hand, in cases where there is no device D satisfying $t_F(i) \leq t_D(i)$, the determiner 25 selects a storage device 30 having a high access performance (e.g., the SSD 3 having the highest access performance) as the storage device 30 of the arrangement destination of the data piece $d_i$ is allocated, in order to shorten the reading time of the data $d_i$.

As described above, the determiner 25 may determine the devices D for arranging the i-th data piece (i=1, 2, ..., N) by the following procedure.

The determiner 25 estimates the respective reading completion times $t_F(i)$ when the first data piece is read from each of the multiple storage device 30 on the basis of the reading performance of each of the multiple storage device 30.

The determiner 25 estimates an estimated receiving time $t_D(i)$ when the acceptor 22 receives a read request for the first data piece on the basis of the process time $T_P(i-1)$ measured by the measure 24.

The determiner 25 determines a storage device 30 that is to store the first data piece on the basis of the multiple estimated reading completion times $t_F(i)$ and the estimated receiving times $t_D(i)$.

For example, the estimated receiving time $t_D(i)$ and the reading completion time $t_F(i)$ may be estimated by the following expressions (12) and (13).

$$t_D(i)=\max(t_D(i-1),t_F(i-1))+T_P(i-1) \quad (12)$$

where $t_D(0)=t_F(0)=T_P(0)=t_{I/O}(0)=0$ $$t_F(i)=t_F(i-1)+T_{I/O}(i) \quad (13)$$

For example, when the above Expressions (12) and (13) are used, the determiner 25 determines whether or not a device D satisfying $t_F(i) \le t_D(i)$ is present. In other words, the determiner 25 determines whether one or more reading completion times $t_F(i)$ concurrently with or prior to the estimated receiving time $t_D(i)$ are present among the multiple reading completion times $t_F(i)$.

Then, in cases where a device D satisfying $t_F(i) \le t_D(i)$ is present, the determiner 25 selects the device D having the smallest $t_D(i)-t_F(i)$ among the devices D as the arrangement destination of the data piece $d_i$. In other words, when one or more reading completion times $t_F(i)$ are present, the determiner 25 determines the storage device 30 corresponding to the reading completion time $t_F(i)$ having the smallest time difference from the estimated receiving time $t_D(i)$ among the one or more reading completion times $t_F(i)$ as the storage device 30 of the arrangement destination of the first data piece.

On the other hand, in cases where a device D satisfying $t_F(i) \le t_D(i)$ is not present, the determiner 25 selects, as the arrangement destination of the data piece $d_i$, a storage device 30 selected in descending order of higher reading performance, for example, the SSD 3 having the highest access performance among the multiple storage devices 30.

The above Expression (1) indicates an Expression for calculating the process time $T_P(i)$, but alternatively, in order to calculate the process time $T_P(i-1)$ as in the above Expression (12), the above Expression (1) may be replaced by the following Expression (14).

$$\text{Process Time } T_P(i-1)=\text{Time } C-\text{Time } D \quad (14)$$

Where the Time C means a time at which a read request for a data piece $d_i$ was received from the processing device 6, and the Time D means a time at which the $d_{i-1}$ was sent to the processing device 6.

As described above, the determiner 25 is an example of a determiner that determines the storage tier for storing the first data piece from among the multiple storage tiers based on the reading performance $B_D$ of each of the multiple storage tiers and the process time $T_P(i-1)$ measured by the measure 24.

As described above, according to the storage controller 20 of one embodiment, the starting time at which the data piece is accessed in the processing device 6 can be estimated on the basis of the WFs given from the application executed in the processing device 6 and the performance data of the storage device 30. Then, the storage controller 20 can arrange the data piece in the storage device 30 having the optimum processability on the basis of the estimation result.

This allows the data piece to be arranged in a storage device 30 having a performance suitable for (matching) the performance of the data piece by the processing device 6. Therefore, it is possible to reduce the time that the processing device 6 waits for a data piece and to efficiently use the storage resource of the storage device 30 having a high access performance.

In addition, since the possibility that the storage resources of a high-performance storage device 30 can be used at the time of executing a WF in another processing device 6 is enhanced, the average performance of all the processing devices 6 that access the hierarchical storage apparatus 2 can be enhanced.

In this manner, the storage controller 20 according to one embodiment can transmit reading data under a stable performance to multiple processing devices 6 that access to a deadline-aware (upper limit time) hierarchical storage system 1 in consideration of a deadline.

[1-6] Example of Operation

Next, with reference to FIGS. 14 and 15, description will now be made in relation to an exemplary operation of the storage controller 20 according to one embodiment configured as the above.

First, description will now be made in relation to a case where the processing device 6 executes a WF multiple tines with reference to FIG. 14. FIG. 14 is a flowchart illustrating an exemplary operation of the storage controller 20 according to one embodiment.

Figure 14:
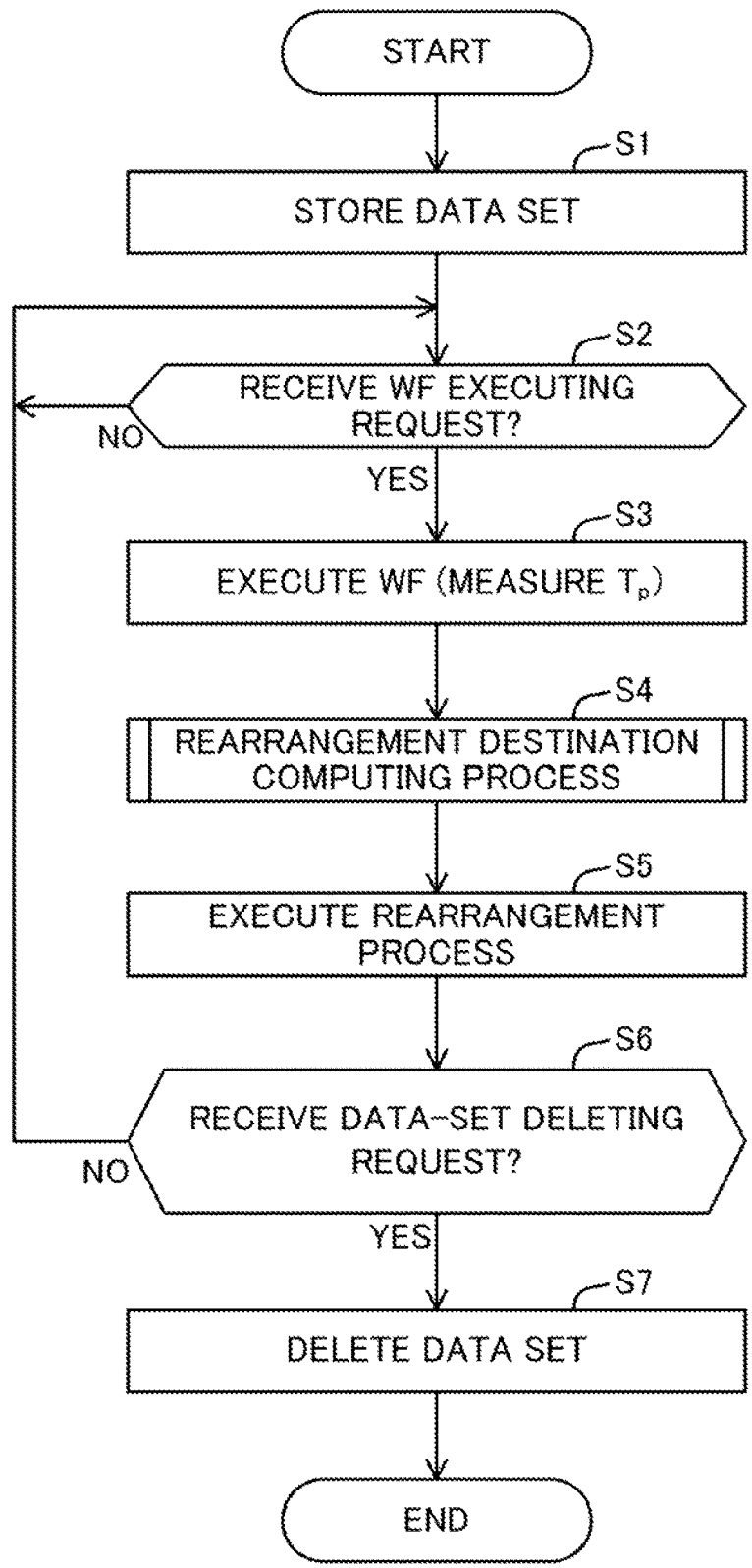
FIG. 14 is a flowchart illustrating an example of an operation of a storage controller according to one embodiment.
Figure 15:
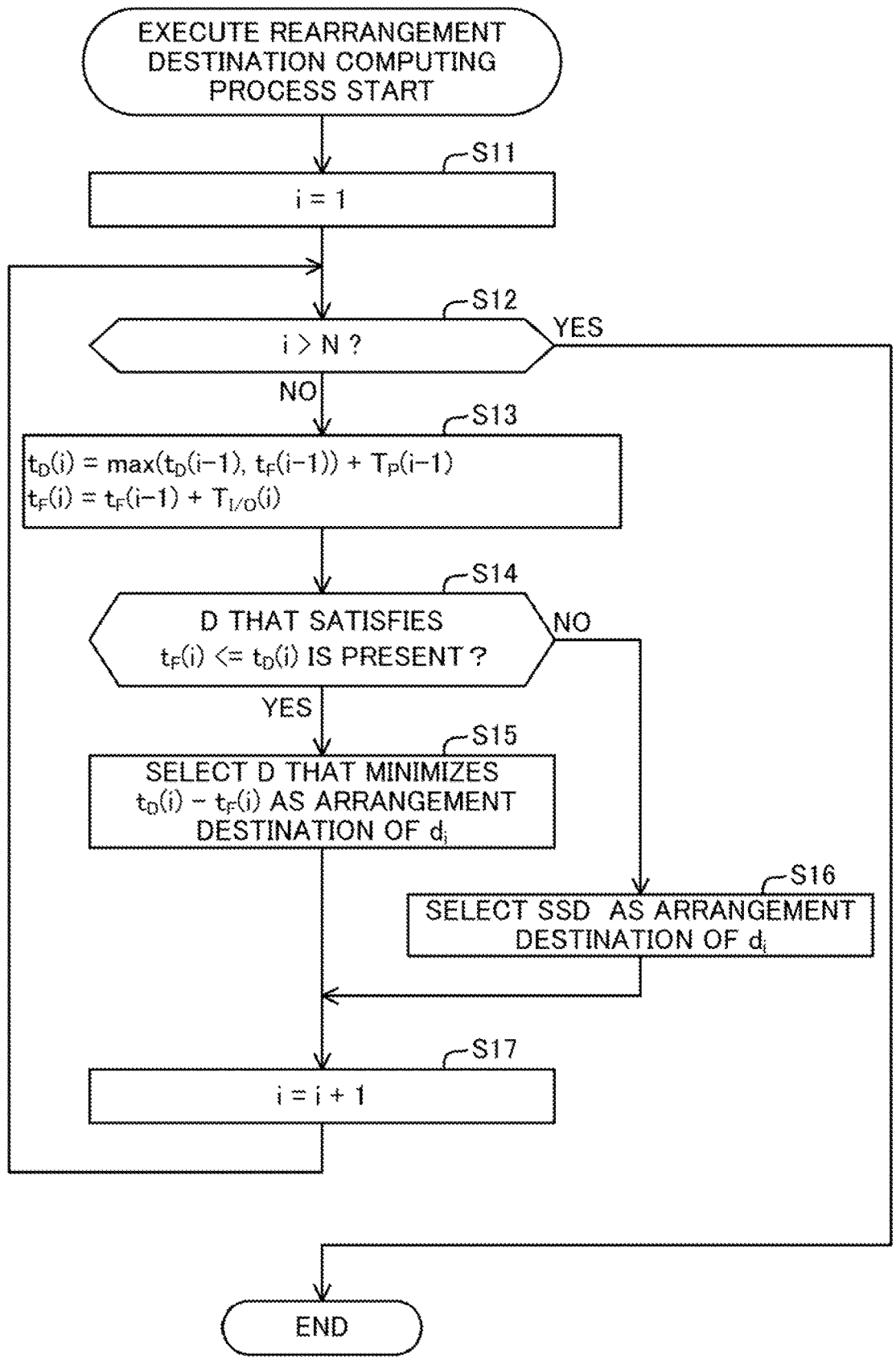
FIG. 15 is a flowchart illustrating an operation example of a rearrangement destination computing process of FIG. 14.

As illustrated in FIG. 14, the storage controller 20 may store a data set to any one of the tiers of the storage device 30 (Step S1). For example, the storage controller 20 may receive a data set from the processing device 6.

The acceptor 22 of the storage controller 20 waits fox receiving a WF executing request from the processing device 6 (Step S2 and No in Step S2). The WF executing request may include at least one of a prefetch request for a data set of the target for the WF and a reading request for the first data piece included in the same data set, and in one embodiment, assumes that the WF executing request includes both of them.

Upon receipt of the WF executing request (Yes in Step S2), the acceptor 22 notifies the accessor 23 of the WF executing request.

In response to the reception of the WF executing request, the accessor 23 accesses the storage device 30 following to the WF execution based on the hierarchy table 21d. For example, the accessor 23 prefetches read data 21a from the storage device 30 to the memory device 21, and also reads the read data 21a from the memory device 21 and transmits the read data to the processing device 6 in response to the reception of the reading request. In addition, the measure 24 measures (estimates) the process time $T_P(i)$ for the data by the processing device 6 by measuring the time the accessor 23 accesses the storage device 30 (Step S3).

The determiner 25 executes a rearrangement destination computing process based on the measured value 21b and the parameter 21c (Step S4), and notifies the migration controller 26 of the information of the storage device 30 selected as the migration destination of each data piece. For example, the determiner 25 may execute the process of Step S4 when the WF execution is completed.

The migration controller 26 executes rearrangement process in units of data piece in response to the notification from the determiner 25 (Step S5). The rearrangement process may include a process of updating the hierarchy table 21d.

The acceptor 22 determines whether a data set deleting request has been received from the processing device 6 or another computer (Step S6). The data set deleting request may be transmitted, for example, when the processing device 6 or another computer determines that the WF execution for the data set is to be terminated (the repeated WF execution is to be terminated).

When the data set deleting request is not received (No in Step S6), the process moves to Step S2, and the acceptor 22 waits for receiving the second or subsequent WF-executing requests.

On the other hand, in cases where receiving a data set deleting request (Yes in Step S6), the storage controller 20 deletes the data set stored in the storage device 30 in Step S1 (or rearranged to another storage device 30 in Step S5) (Step S7), and ends the process.

Next, an example of operation in the rearrangement destination computing process depicted in Step S4 of FIG. 14 will be described with reference to FIG. 15. The values of N and $d_i$, $S_i$ in the parameter 21c may be set based on the data set prior to the process in Step S4 of FIG. 14, for example. The values of $B_D$ and $T_{I/O}$ (i) in the parameter 21c may be set, for example, after the storage controller 20 is started.

The determiner 25 sets "1" to the variable i (Step S11), and determines whether i>N or not (Step S12).

If i>N (Yes in Step S12), the process ends. On the other hand, when i>N is not satisfied (No in Step S12), the determiner 25 calculates the following Expressions (15) and (16) below (step S13).

$$t_D(i) = \max(t_D(i-1), t_F(i-1)) + T_P(i-1) \quad (15)$$

$$t_P(i) = t_F(i-1) + T_{I/O}(i) \quad (16)$$

Next, the determiner 25 determines whether or not a device D satisfying $t_F(i) \leq t_0(i)$ is present (Step S14).

In cases where a device D satisfying $t_F(i) \leq t_D(i)$ is present (YES in Step S14), the determiner 25 selects the device D having the smallest $t_D(i) - t_F(i)$ as the arrangement destination of the data piece $d_i$ (Step S15), and the process moves to Step S17.

On the other hand, in cases where device D satisfying $t_F(i) \leq t_D(i)$ is not present (No in Step S14), the determiner 25 selects the SSD 3 as arrangement destination of the data piece $d_i$ (Step S16), and the process proceeds to Step S17.

In step S17, the determiner 25 adds "1" to the variable i, and the process proceeds to Step S12.

[2] Miscellaneous

The technique according to one embodiment described above can be implemented by modifying or modifying as follows.

For example, the functional blocks of the storage controller 20 illustrated in FIG. 6 may be merged in any combinations, or may be divided. The functional blocks of the storage controller 20 include the acceptor 22, the accessor 23, the measure 24, the determiner 25 and the migration controller 26.

As described above, measuring of the process time $T_p(i)$, determining of the storage device 30 that is to serve as the rearrangement destination, and execution of the rearrangement process may be performed each time the WF is executed, taking into account the possibility that the process time for a data piece by the processing device 6 changes each time a WF is executed.

For example, the determiner 25 may store (evacuate) the measured values 21b measured in a WF repeatedly executed in the memory 21 for each time the WF is executed. Then, the determiner 25 may stop the determination in cases where the process time $T_p(i)$ is not different from the process time $T_p(i)$ measured in the previous WF, or if the change is equal to or less than a predetermined threshold (e.g., about several percent). The determination by the determiner 25 may be stopped in units of data, or in units of WF, over all the data related to the WF. Furthermore, such stepping of the determination by the determiner 25 may accompany stopping of the migration control by the migration controller 26.

Furthermore, in one embodiment, the measure 24 measures the process time $T_p(i)$ that the processing device 6 takes for each data piece $d_i$, and the determiner 25 uses each process time $T_p(i)$ to determine the storage device 30 of the storage destination of the corresponding data piece $d_i$, but the present invention is not limited thereto. For example, the measure 24 may calculate the process time $T_p$ common to the data pieces $d_1$ to $d_N$ included in a data set, for example, by taking an average or a weighted average of the process times $T_p(1)$ to $T_p(N)$. In this case, the determiner 25 may use the common process time TP to determine the storage device 30 of each storage destination of each the data pieces $d_1$ to $d_N$.

The one embodiment is described as the above, exemplifying the hierarchical storage system 1, but is not limited thereto. Alternatively, the same effects as those of one embodiment can be obtained by applying the scheme according to one embodiment to various information processing system having multiple storage tiers.

As one aspect, an appropriate arrangement destination of a data piece in multiple storage tiers can be determined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control apparatus comprising:
   a memory; and
   a processor coupled to the memory, the processor being configured to execute a procedure, the procedure comprising:
   storing N data pieces (where, N is an integer of two or more) included in a data set into at least one of a plurality of hierarchical storage tiers having respective different reading capabilities;
   receiving, from a processing device, a reading request to read an i-th data piece (where, i is an integer of one or more and N or less) among the N data pieces during k-th execution (where, k is an integer of one or more) of a unit process including a given process performed on each of the N data pieces, the processing device repeatedly executing the unit process;
   reading the i-th data piece from a first storage tier that stores the i-th data piece among the plurality of hierarchical storage tiers;
   transmitting the i-th data piece read from the first storage tier to the processing device in response to the reading request;
   computing a processing time that the processing device takes to execute the given process on the i-th data piece based on a receiving time when the processor receives the reading request from the processing device and based on a transmitting time when the processor transmits an (i−1)-th data piece among the N data pieces to the processing device;

determining a storage tier that is to store the i-th data piece among the plurality of hierarchical storage tiers based on the reading capabilities of the plurality of the hierarchical storage tiers and based on the computed processing time; and migrating the i-th data piece from the first storage tier to the determined storage tier before receiving a reading request to read the i-th data piece during (k+1)-th execution of the unit process.

2. The control apparatus according to claim 1, wherein the determining of the storage tier that is to store the i-th data piece by the processor comprises:

estimating respective reading completion times when the i-th data piece is read from the plurality of hierarchical storage tiers based on the reading capabilities of the plurality of hierarchical storage tiers;

estimating an estimated receiving time when the processor receives a reading request for the i-th data piece based on the processing time computed by the processor; and determining the storage tier that is to store the i-th data piece based on the plurality of reading completion times estimated and the estimated receiving time.

3. The control apparatus according to claim 2, wherein the procedure further comprises:

determining whether one or more reading completion times previous to the estimated receiving time is present in the plurality of reading completion times; and determining, in a case that one or more reading completion times previous to the estimated receiving time is present, a storage tier associated with one of the reading completion times previous to the estimated receiving time having a smallest time difference from the estimated receiving time to be the storage tier that is to store the i-th data piece.

4. The control apparatus according to claim 3, wherein the procedure further comprising:

determining, in case that the one or more reading completion times previous to the estimated receiving time is not present, a storage tier selected in an order of having higher reading capabilities from the plurality of hierarchical storage tiers to be the storage tier that is to store the i-th data piece.

5. The control apparatus according to claim 1, wherein the determining of the storage tier that is to store the i-th data piece by the processor comprises determining the storage tier that is to store the i-th data piece after the k-th execution of the unit process is completed and before the (k+1)-th execution of the unit process starts.

6. The control apparatus according to claim 1, wherein the procedure further comprises:

determining a storage tier that is to store each of the N data pieces; and migrating each of the N data pieces to the storage tier determined.

7. A non-transitory computer-readable recording medium having stored therein a control program that causes a computer to execute a process comprising:

storing N data pieces (where, N is an integer of two or more) included in a data set into at least one of a plurality of hierarchical storage tiers having respective different reading capabilities;

receiving, from a processing device, a reading request to read an i-th data piece (where, i is an integer of one or more and N or less) among the N data pieces during k-th execution (where, k is an integer of one or more) of a unit process including a given process performed on each of the N data pieces, the processing device repeatedly executing the unit process;

reading the i-th data piece from a first storage tier that stores the i-th data piece among the plurality of hierarchical storage tiers;

transmitting the i-th data piece read from the first storage tier to the processing device in response to the reading request;

computing a processing time that the processing device takes to execute the given process on the i-th data piece based on a receiving time when the computer receives the reading request from the processing device and based on a transmitting time when the computer transmits an (i−1)-th data piece among the N data pieces to the processing device;

determining a storage tier that is to store the i-th data piece among the plurality of hierarchical storage tiers based on the reading capabilities of the plurality of the hierarchical storage tiers and based on the computed processing time; and migrating the i-th data piece from the first storage tier to the determined storage tier before receiving a reading request to read the i-th data piece during (k+1)-th execution of the unit process.

8. The non-transitory computer-readable recording medium according to claim 7, wherein the determining of the storage tier that is to store the i-th data piece by the computer comprises:

estimating respective reading completion times when the i-th data piece is read from the plurality of hierarchical storage tiers based on the reading capabilities of the plurality of hierarchical storage tiers;

estimating an estimated receiving time when the computer receives a reading request for the i-th data piece based on the processing time computed by the computer; and determining the storage tier that is to store the i-th data piece based on the plurality of reading completion times estimated and the estimated receiving time.

9. The non-transitory computer-readable recording medium according to claim 8, wherein the process further comprises:

determining whether one or more reading completion times previous to the estimated receiving time is present in the plurality of reading completion times; and determining, in a case that one or more reading completion times previous to the estimated receiving time is present, a storage tier associated with one of the reading completion times previous to the estimated receiving time having a smallest time difference from the estimated receiving time to be the storage tier that is to store the i-th data piece.

10. The non-transitory computer-readable recording medium according to claim 9, wherein the process further comprises:

determining, in case that the one or more reading completion times previous to the estimated receiving time is not present, a storage tier selected in an order of having higher reading capabilities from the plurality of hierarchical storage tiers to be the storage tier that is to store the i-th data piece.

11. The non-transitory computer-readable recording medium according to claim 7, wherein the determining of the storage tier that is to store the i-th data piece by the computer comprises determining the storage tier that is to store the i-th data piece after the k-th execution of the unit process is completed and before the (k+1)-th execution of the unit process starts.

12. The non-transitory computer-readable recording medium according to claim 7, wherein the process further comprises:
   determining a storage tier that is to store each of the N data pieces; and
   migrating each of the N data pieces to the storage tier determined.

\* \* \* \* \*